Figure 2:
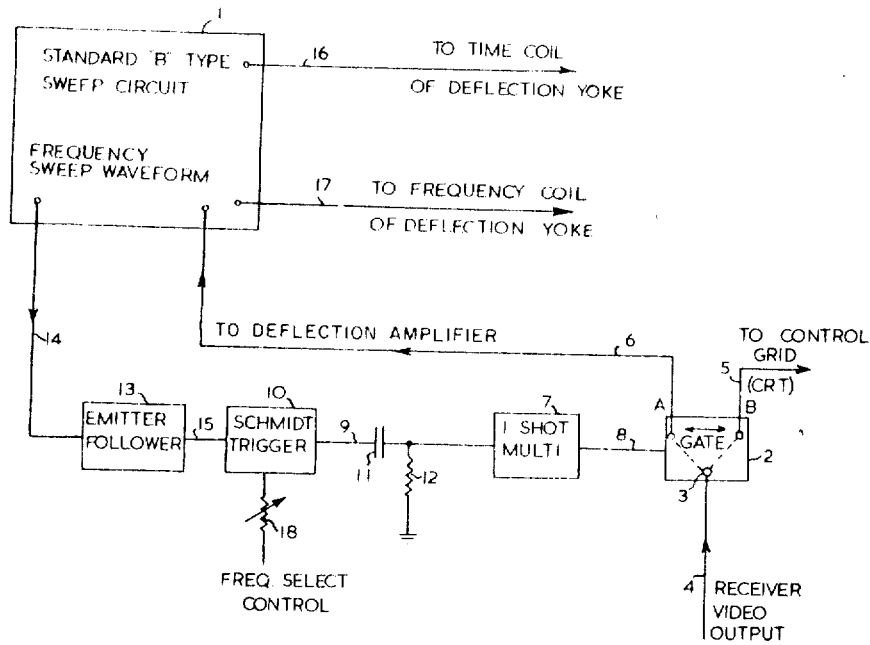

COMBINED "A" AND "B" DISPLAY

COMBINED "A" AND "B" DISPLAY

United States Patent Office 3,284,659
Patented Nov. 8, 1966

---

3,284,659
APPARATUS AND METHOD FOR COMBINING "A" AND "B" TYPE DISPLAYS ON AN OSCILLOSCOPE HAVING A "B" TYPE SWEEP CIRCUIT
Laurence Edmund Outhouse, Truro, Nova Scotia, and Dennis Henry Covill, Hacketts Cove, Nova Scotia, Canada, assignors to E.M.I.-Cossor Electronics Ltd., Dartmouth, Nova Scotia, Canada
Filed Jan. 9, 1964, Ser. No. 336,760
Claims priority, application Canada, Oct. 29, 1963, 887,840
13 Claims. (Cl. 315—22)

This invention relates to an apparatus and a method for combining "A" and "B" type displays independently or simultaneously on the same cathode ray tube. In particular, the invention is intended for use with conventional ionospheric sounding equipment.

The type "A" oscilloscope has a linear time base and the incoming video signal is applied to the vertical deflection plates and a saw-tooth sweep voltage applied to the horizontal plates, thus providing deflection modulation. In radar range measurement the horizontal sweep is usually started by an initial impulse provided by the associated transmitter and its rate of sweep is adjusted to suit the range being measured, the sweep continuing with the application of further impulses from the transmitter. The vertical deflection is observed due to a received signal on a single frequency. The range of objects intercepted by the transmitted impulses are indicated by blips horizontally displaced, across the sweep, by an amount which is proportional to the range. The relative height of the blip is a function of the size of the reflecting object.

In the type "B" oscilloscope, the incoming video signal is used to intensity-modulate the beam by being applied to the control grid. In its application to radar, the vertical plates are free, and a voltage is impressed thereon which voltage corresponds to the azimuth of the antenna. The trace then rises and falls in phase with the position of the antenna.

Since it is necessary for the equipment operator to display and correlate simultaneously the signal strength, multipath, and noise level on any frequency, the use of separate "A" and "B" type displays is not only impractical, but requires individual sweep circuits.

It is a feature of this invention to provide a display system for showing "A" and "B" type displays independently or simultaneously on the same C.R.T.

It is a further feature of this invention to provide a combined "A" and "B" display wherein the "A" frequency may be independently selected.

By a broad aspect of the present invention, there is provided a combined "A" and "B" type display for ionospheric sounding systems, including, a cathode ray tube having deflection time coil means, deflection frequency means and control grid means, and "A-B" gate have an "A" output and a "B" output, said gate being adapted to switching said incoming signal alternately between said "A" and "B" outputs, a "B" type sweep circuit having a deflection time output connected to and controlling said deflection time coil means, a deflection frequency output means, and a frequency sweep output connected to and controlling said "A–B" gate. The present invention also provides a method of combining "A" and "B" type displays on a "B" type sweep oscilloscope having input terminals associated with the control grid and the deflection amplifier and an output terminal associated with the frequency sweep waveform, said method including the steps of switching an incoming signal alternately between said control grid and said deflection amplifier, providing a variable frequency trigger circuit to control said switching operation, utilizing said frequency sweep waveform to control said trigger circuit and varying said trigger frequency until it is synchronous with a selected frequency.

An advantage of the present invention is that there is provided a system for combining "A" and "B" displays independently or simultaneously on the same C.R.T. The system has the feature of an independent selection of the "A" frequency which enables the equipment operator to correlate simultaneously the signal strength, multipath, and noise level on any selected frequency.

Figure 1:
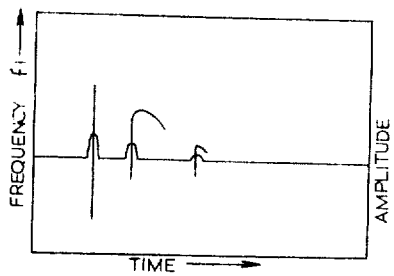

In the drawing:

FIG. 1 is a representation of a typical Ionogram taken on an oblique path (point to point), upon which the "A" display at frequency $f_1$ has been superimposed as would be the case when observed with the combined "A" and "B" display, and FIG. 2 is a block diagram of the circuit required to obtain this type of display.

Referring to FIG. 1, there is shown the combined "A" and "B" displays. The "A" display is provided by vertical deflection produced by impressing the incoming video signals on the vertical deflection plates and applying a linear saw-tooth voltage to the horizontal deflection plates. Thus, the trace is a plot of amplitude versus time. The blips produced occur at positions displaced from the start of the sweep corresponding to the range of an object causing a reflection. The amplitude of the blip is related to the size of the object causing the reflection.

However in ionospheric sounding equipment, the emitter energy is swept cyclically through a given frequency band and display forming an Ionogram comprises a trace formed by impressing the incoming video signal from the receiver onto the control grid of the C.R.T. This results in intensity modulation of the beam with the vertical plates left free. The vertical plates are provided with a voltage corresponding to the frequency of the emitted energy and the trace moves up and down in phase with the frequency sweep. The vertical height of the C.R.T. display corresponds to a complete frequency band and a selected frequency designated $F_1$, forms the base for the trace. Such a display in the sounding art is termed a "B" display.

The block diagram shown in FIG. 2 shows the circuit required to combine the "A" and "B" types into a single display. A standard "B" type sweep circuit, 1, is used with the addition of the unique circuitry for superimposing the "A" display upon the Ionogram.

The design of this circuit is such that at any one frequency the received signal is switched from the control grid of the C.R.T. to the frequency coil of the deflection yoke by means of an "A-B" gate.

The video output from the receiver is connected to the common input terminal 3, by connection 4 and the "A" and "B" outputs from the gate are correspondingly identified.

The "A-B" gate is a balanced video gate and in its normal position will pass the incoming video signal to the control grid of the C.R.T. via connection 5. The gate may be switched from its normal position at B to the other position at A by the application of a negative voltage. In the A position, the output from the gate is passed, by connection 6, to the sweep amplifier, where the signal is added to the frequency sweep, thus producing an amplitude display. The base-line of this amplitude display is that of the selected frequency.

The voltage pulse which switches the gate from the "B" to the "A" display is derived from a one-shot multivibrator 7, which is connected to the gate by line 8. The length of the pulse is fixed at 1, the frequency switching rate. In order that the gating pulse be synchronised with a particular selected frequency, the one-shot multivibrator 7, is connected by line 9 to a Schmitt trigger 10. The output from the Schmitt trigger is differentiated by the capacitor and resistance, 11 and 12, respectively. The Schmitt trigger 10 is driven by the frequency sweep waveform output from the "B" type sweep circuit 1 via an emitter follower 13 and connections 14 and 15. The Schmitt trigger 10 is provided with a frequency selection control 18. The level at which the Schmitt triggers is thus directly related to the frequency.

The standard "B" type sweep circuit has the usual outputs for driving the deflection yoke. A first output is connected via line 16 to the time coil of the deflection yoke and a second output is connected to the frequency coil of the deflection yoke via line 17.

The operator may therefore select an appropriate frequency for the "A" display by adjusting the control 18 and each time the frequency sweep waveform reaches a level corresponding to the frequency selected by adjustment of 18, the "A-B" gate is triggered and the received video waveform for that particular frequency is switched to the frequency coil of the deflection yoke and produces a vertical deflection from the level of that particular sweep. When the usual relatively slow image decays, the "A" and "B" displays are combined together.

We claim:

1. A method of combining "A" and "B" type displays in a "B" type sweep oscilloscope having input terminals associated with the control grid and the frequency coil of the deflection yoke and an output terminal associated with the frequency sweep waveform, said method including the steps of:
   (i) switching an incoming signal alternately between said control grid and said frequency coil of the said deflection yoke,
   (ii) providing a variable frequency trigger circuit to control said switching operation,
   (iii) utilizing said frequency sweep waveform to control said trigger circuit, and
   (iv) varying said trigger frequency until it is synchronised with a selected frequency.

2. A circuit for combining "A" and "B" type displays in a "B" type sweep oscilloscope having input terminals associated with the control grid and the frequency coil of the deflection yoke and an output terminal associated with the frequency sweep waveform, said circuit including,
   (i) "A-B" gating means connected, firstly, to the said control grid and, secondly, to said frequency coil of the said deflection yoke, and adapted to switch an incoming signal, alternately, to said control grid and to said frequency coil of the said deflection yoke, and,
   (ii) trigger means connected between said frequency sweep waveform output terminal, and said "A-B" gating means and adapted to control said "A-B" gate, said trigger means including a frequency selection control, whereby said trigger is synchronised with a selected frequency.

3. The circuit of claim 2 wherein said trigger means includes a Schmitt trigger circuit.

4. The circuit of claim 3 wherein said trigger means includes an emitter follower and a one-shot multivibrator.

5. A combined "A" and "B" type display for ionospheric sounding systems including,
   (i) a cathode ray tube having deflection time coil means, deflection frequency means, and control grid means,
   (ii) an "A-B" gate having an "A" output and a "B" output, said gate being adapted to switch said incoming signal alternately between said "A" and "B" outputs, and,
   (iii) a "B" type sweep circuit having a deflection time output connected to and controlling said deflection time coil means, a deflection frequency output connected to and controlling said deflection frequency means, and a frequency sweep output connected to and controlling said "A-B" gate.

6. The apparatus of claim 5 including a Schmitt trigger and an associated frequency select control between said frequency sweep output and said "A-B" gate.

7. The apparatus of claim 6 including an emitter follower connected between said frequency sweep waveform output and said Schmitt trigger and a one-shot multivibrator between said Schmitt trigger and said "A-B" gate.

8. A cathode ray tube auxiliary circuit for combining "A" and "B" type displays, including,
   (i) a cathode ray tube having a deflection yoke time coil and a first input terminal associated therewith, a deflection yoke frequency coil and a second input terminal associated therewith, a control grid and a third terminal associated therewith,
   (ii) "A-B" gating means having an input terminal adapted to receive an incoming video signal, and a pair of output terminals, and adapted to switch said incoming signal alternately between one, identified by A, or other, identified by B, of said pair of output terminals, said B output terminals being connected to said third terminal of said C.R.T.
   (iii) a standard "B" type sweep circuit having time coil means and a first output terminal associated therewith, frequency coil means and a second output terminal associated therewith, frequency sweep waveform means and a third output terminal associated therewith, a deflection amplifier having a fourth input terminal associated with said deflection amplifier said first and second output terminals being connected to said first and second input terminals, respectively, of said C.R.T., said fourth input terminal being connected to said "A" output terminal of said gating means, and,
   (iv) trigger means having a frequency selection control, and connected firstly to the said third output terminal of said sweep circuit and responsive thereto, and secondly to the "A-B" gating means, whereby said gating means is triggered alternately between said "A" and "B" output terminals, whereby said trigger is synchronised with a selected frequency.

9. The apparatus of claim 8 wherein said trigger means includes a Schmitt circuit.

10. The apparatus of claim 8 wherein said trigger means includes a Schmitt circuit, an emitter follower, and a one-shot multivibrator.

11. A combined "A" and "B" display for ionospheric sounding systems, including,
   (i) a cathode ray tube including deflection yoke time coil and a first input terminal associated therewith, a deflection yoke frequency coil and a second input terminal associated therewith, a control grid and a third input terminal associated therewith,
   (ii) an "A-B" gate having an input terminal adapted to receive an incoming video signal, a pair of output terminals identified by "A" and "B" respectively, said "B" output terminal being connected to said third input terminal, said "A-B" gate being adapted to switch said incoming signal on application of a negative triggering voltage, alternately to said "A" and "B" terminals,
   (iii) a "B" type sweep circuit having a time coil output and first output terminal associated therewith, a frequency coil output and a second output terminal associated therewith, and a frequency sweep waveform output and a third output terminal associated therewith, said first and second outputs being connected to said first and second inputs, respectively, a deflection amplifier and a fourth input terminal associated therewith, said fourth input terminal being connected to said "A" terminal of said "A-B" gate, and,
   (iv) trigger means connected between said third output terminal and said "A" terminal, said trigger means having a frequency select control, said trigger means being responsive to said frequency sweep waveform and adapted to trigger said incoming signal alternately between said "A" and "B" terminals.

12. The apparatus of claim 11 wherein said trigger means include a Schmitt trigger.

13. The apparatus of claim 12 wherein said trigger means includes an emitter follower before said Schmitt trigger and a one-shot multivibrator following said Schmitt trigger.

References Cited by the Examiner
UNITED STATES PATENTS 3,167,680  1/1965  Seestrom _____ 315—23

DAVID G. REDINBAUGH, *Primary Examiner.*

T. A. GALLAGHER, *Assistant Examiner.*